S. P. MILLER.
FLAKE PARACOUMARON.
APPLICATION FILED JAN. 8, 1921.
1,431,676.
Patented Oct. 10, 1922.
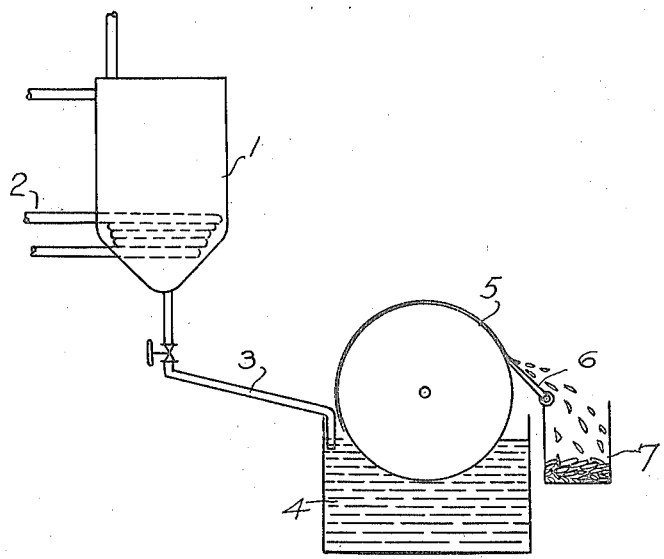
INVENTOR
Stuart P. Miller
BY
Chas. W. Mortimer
ATTORNEY

Patented Oct. 10, 1922.

1,431,676

UNITED STATES PATENT OFFICE.

STUART P. MILLER, OF PHILADELPHIA, PENNSYLVANIA, ASSIGNOR TO THE BARRETT COMPANY, A CORPORATION OF NEW JERSEY.

FLAKE PARACOUMARON.

Application filed January 8, 1921. Serial No. 436,005.

*To all whom it may concern:*

Be it known that I, STUART P. MILLER, a citizen of the United States, residing at Philadelphia, in the county of Philadelphia and State of Pennsylvania, have invented certain new and useful Improvements in Flake Paracoumaron, of which the following is a specification.

This invention relates to the production of small particles, such as chips or flakes, of so-called paracoumaron. This is a resin which may be produced by polymerizing the polymerizable constituents of coal-tar naphtha by treatment with sulfuric acid, aluminum chloride or otherwise to produce a resin that is hard at ordinary atmospheric temperatures.

This resin may be produced having various degrees of hardness from that which has a melting point of 50° C. or lower to about 150° C. or higher, depending largely upon the method of its manufacture. After the polymerization treatment of the naphtha to produce the resin, it is distilled to remove the lighter or low boiling constituents, leaving the resin as a residue, which residue is a liquid while still hot. This hot liquid resin is sometimes run into shipping containers where it is allowed to harden and set. In such cases it is difficult to remove the resin from the container, often requiring the destruction or injury of the container and waste of some of the resin as it sticks to the sides of the container and is lost.

Instead of running the hot resin directly into the shipping containers, it may be run into bays or bins where it is likewise allowed to harden and set, but in this case it must be subsequently broken up or dug out for shipment. This procedure also entails losses and expense, as the hard grades especially break up into lumps of various sizes and some of it becomes powdered and lost. The material is liable to become contaminated when lying around in open containers, the labor required to get it out is expensive, and the operation is a dirty or dusty and disagreeable one. In the form in which the material is produced by following the practice of either method outlined above, the material is obtained in the form of irregular lumps, and the irregular lumps are inconvenient as the same do not melt uniformly but require to be crushed to somewhat uniform sizes when the material is being prepared for uses such as varnish manufacture, filler for rubber, etc.

The object of my invention is to produce the material in a form in which it has never heretofore been produced, in which form it will be much more suitable and convenient for shipping and handling and will avoid the losses and inconveniences heretofore experienced with this material. In practicing the invention I produce the paracoumaron in the form of chips or flakes of a somewhat uniform size in any convenient way so as to render the same easy to handle and obviate the difficulties and objections heretofore common with this material. These chips do not require to be further pulverized for either varnish or rubber manufacture or for other uses.

I may, for example, spread the material while still hot in the form of a thin film upon the surface of a smooth cylinder where it is allowed to cool, and then scrape it off in the form of thin flakes or chips which may be gathered up and shipped in different sorts of containers of various shapes and sizes.

A device is somewhat diagrammatically illustrated in the accompanying drawing showing how the chips or flakes may be produced, but it is to be understood that this is merely illustrative of a device for making the flakes of resin, as the new feature of this invention is the new form of this material which no one else has heretofore produced, as far as I am aware.

In the drawings, reference character 1 designates a still in which the polymerized naphtha is heated to drive off the volatile products by means of the coil 2, or the still may be heated in any other convenient manner. As soon as the necessary amount of volatile products have been driven off, the residue is allowed to flow through the pipe 3 into the vat 4, in which vat 4 is a smooth cylinder 5 which is revolved in the direction indicated by the arrow in any convenient way. The cylinder 5 may be cooled by circulating cold water through the same, or in any other convenient manner. The cylinder 5, which dips into the material in the vat 4, picks up a thin film of the liquid material in the vat 4, and as the cylinder 5 slowly revolves in the direction of the arrow, this film becomes cool and hardens and is scraped off by means of the scraper or doctor 6 and is broken up into small particles which fall into the container 7.

I am aware that films of material that can be rendered hard and dry by the application of heat have been formed on cylinders and scraped off, but the material with which I work is of such a nature or character that it becomes soft and plastic upon being heated and is difficut to grind because of its tendency to become sticky or plastic when warm.

The total cost of production of the material is considerably lessened by the manufacture of the material in chipped form, as herein described, as the cost of preparation is less than when it is cooled in bays and broken up, and the cost of packing is less than when the product is run molten into shipping containers and allowed to harden and stick to the walls thereof. It has been found that flakes of certain resins of low melting point become sticky or cling together to some extent even at ordinary atmospheric temperatures when allowed to stand for a long time, and for this reason more satisfactory results are obtained with resins which have a melting point of 95° C., or higher than with the ones having low melting points.

Throughout the specification and claim I intend the word "paracoumaron" to refer to the resin which is obtained by the polymerization treatment of coal-tar naphtha, although the resin may comprise both polymerized coumaron and other polymerized compounds. Also, the work "flakes" is to be understood as meaning flakes, chips or thin pieces of the material.

I claim:

Paracoumaron in the form of flakes.

In testimony whereof I affix my signature.

STUART P. MILLER.